April 12, 1949.     H. N. HALL ET AL     2,467,127
MOUNTING FOR MAGNETOSTRICTIVE DRIVING UNITS
Filed March 14, 1946     2 Sheets-Sheet 1
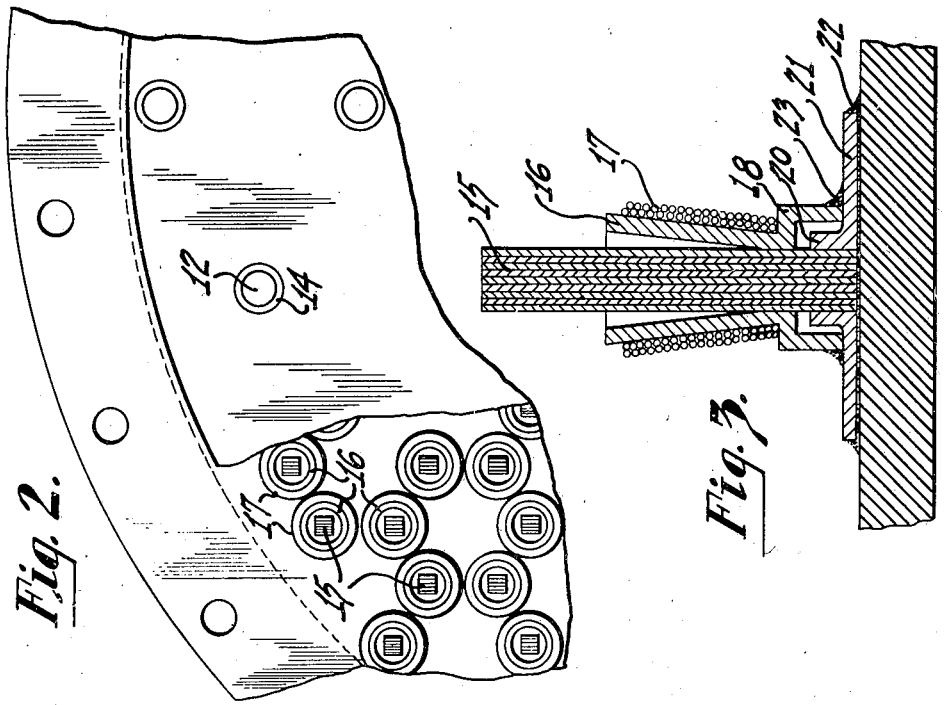
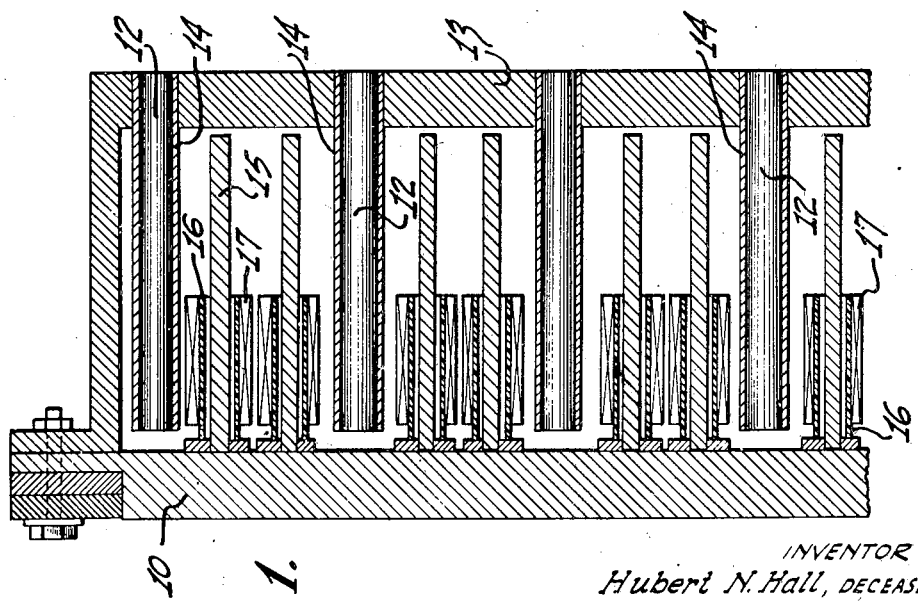
INVENTOR
Hubert N. Hall, DECEASED
BY, Ernestine M. Hall, EXECUTRIX
& J. Guy Woodward
BY CD Tuska
ATTORNEY

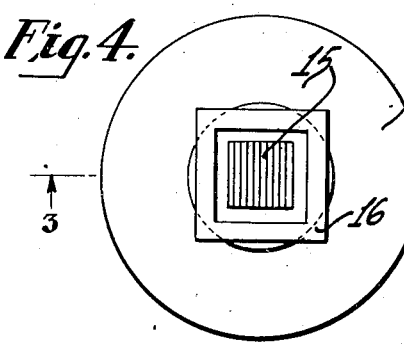
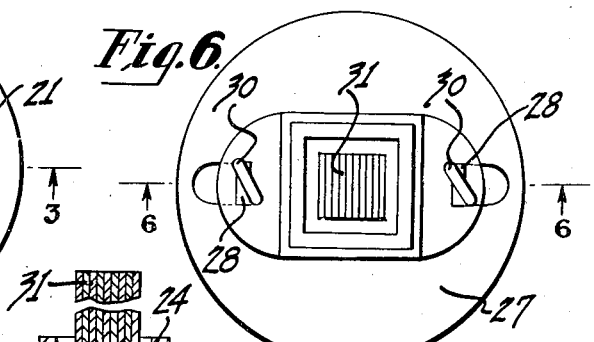
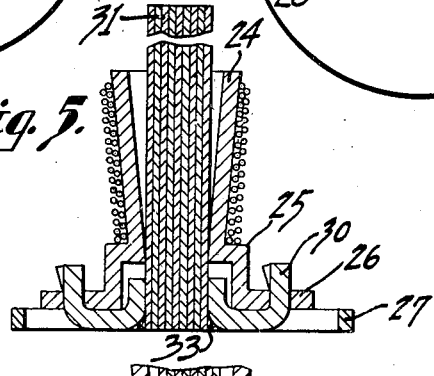
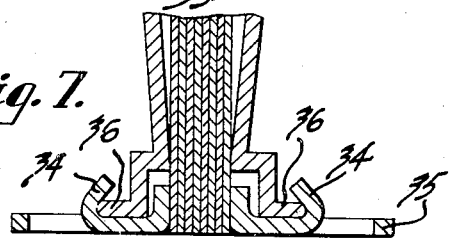
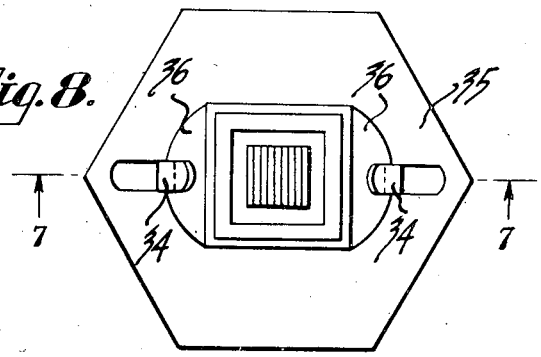

Patented Apr. 12, 1949

2,467,127

UNITED STATES PATENT OFFICE

2,467,127

MOUNTING FOR MAGNETOSTRICTIVE DRIVING UNITS

Hubert N. Hall, deceased, late of Princeton, N. J., by Ernestine May Hall, executrix, Princeton, N. J., and J. Guy Woodward, Princeton, N. J., assignors to Radio Corporation of America, a corporation of Delaware Application March 14, 1946, Serial No. 654,472

7 Claims. (Cl. 177—386)

The present invention relates to transducers, and more particularly to a magnetostrictive signal translating device especially useful in underwater signalling systems, echo range systems, and the like.

Conventional magnetostrictive projectors usually comprise a hollow casing enclosed at one end by a vibratory magnetic diaphragm upon which a plurality of magnetostrictive tubes are mounted. It is desirable that all of the tubes shall have the same resonant frequency, and to this end care is exercised to see that all of the tubes are of the same length. Notwithstanding this precaution, however, the resonance will not be the same, due to variation of mass in the mounting means. Another disadvantage of conventional magnetostrictive projectors is that the diaphragm is usually about an inch thick. This makes it difficult to drive all parts of the diaphragm in phase due to the inherent stiffness. These factors contribute to a relatively low efficiency. Furthermore, the relatively large clearance between each coil and its associated magnetostrictive tube contributes to the lowered efficiency of the projector.

Some of the objects of the present invention are: to provide an improved transducer of the magnetostrictive signal translating type; to provide an improved magnetostrictive transducer which will be free from the aforementioned and other difficulties inherent in prior art projectors; to provide an improved magnetostrictive transducer which has a very high efficiency; to provide an improved driving system for magnetostrictive transducers which will drive all parts of the diaphragm with the same phase; to provide an improved mounting for the driving units of a magnetostrictive transducer; to provide a novel driving system for magnetostrictive transducer wherein the ratio of driving rod mass to diaphragm mass is increased, as compared to conventional system with a reduction in Q performance; and to provide other improvements as will hereinafter appear.

In the accompanying drawings, Fig. 1 represents a fragmentary transverse section of a driving unit of a transducer embodying one form of the present invention; Fig. 2 represents a fragmentary plan, partly broken away, of the same; Fig. 3 represents a longitudinal section of one driving unit, as illustrative of the novel mounting of all such units; Fig. 4 represents a plan of the unit shown in Fig. 3; Fig. 5 represents a longitudinal section of such a driving unit illustrating a modified form of the mounting, Fig. 6 represents a plan of the unit shown in Fig. 5; Fig. 7 represents a fragmental section of a modified form of mounting; and Fig. 8 represents a plan of the unit of Fig. 7.

Referring to the drawings, the transducer comprises a diaphragm 10 formed of relatively thin vibratory material, such as steel or magnesium, and to which the driving units are attached to have telescopic relation with respect to a plurality of polarizing magnets 12 supported by a flux distributing back plate 13. The magnets 12 and the plate 13 complete the magnetic circuit which carries the polarizing flux. Preferably, the magnets 12 are in the form of Alnico rods encased in brass tubes 14. The driving units in the present instance, each comprise a driving rod 15 formed of nickel laminations bonded together with a suitable bonding material, and axially disposed within and projecting from a molded coil form 16 carrying the driving coil 17. As shown the form 16 is tapered and centered about the rod 15 so that clearance is provided which prevents energy loss from rubbing of the two parts. The coil form is so proportioned that the close fitting portion is at the node of the rod.

As shown, the form 16 has its supported end in the form of an inverted cup 18 through which the rod 15 passes to enter and be supported by the flanged square hub 20 of a base washer 21 preferably of thin sheet metal. As assembled, the base washer 21 and the encircled end of the driving rod seat upon the face of the diaphragm 10. The contact face of the washer 21 is machined smooth after silver soldering and is bonded to the diaphragm 10 by Gelva, soft solder, or other suitable bonding material as indicated at 22, while the coil form 16 is cemented to the base washer 21, as indicated at 23.

In the form of the invention shown in Figs. 5 and 6, the coil form 24 has its base portion formed at an inverted cup 25 provided with laterally disposed side flanges 26 which seat upon the base washer 27 and are respectively anchored thereto by providing slots 28 to receive upstanding lugs 30 struck from the washer 27. These lugs 30 extend through the respective slots 28 and project an appreciable distance above the plane of the top of the flanges 26. When the coil form 24 is assembled and seated upon the washer 27, the two lugs 30 are twisted to overlie the flanges and thus unite the parts together. As in the form of Figs. 3 and 4, the end of the driving rod 31 is silver soldered into the square hole of the washer hub 32 as indicated at 33.

In the form of driving unit mounting shown in Figs. 7 and 8, the general assembly of the driving rod and coil form are the same as heretofore described but in this instance lugs 34 are struck up from the washer 35 in such spaced relation as to receive the flanges 36 of the coil form between them, and by bending the lugs 34 over the respective flanges 36, the parts are firmly anchored. The washer 35 is bonded to the diaphragm as in the other forms of the invention. It should be noted that the washer 35 is preferably hexagonal in shape as this may allow the rods to be oriented in a particular manner relative to the axis of the diaphragm.

From the foregoing it will be understood that the signal translating units comprising the washers, laminated rods, and the coils are distributed in any desired manner over the entire surface of the diaphragm and as many of them may be used as will be found necessary. It will be understood, also, that each of the units can be removed individually and separately tuned to a common resonant frequency, after which all of the units can be remounted on the diaphragm 10 with the assurance that they will remain tuned to this frequency.

A projector having a driving system of the type described above can employ a diaphragm which is much thinner than conventional diaphragms (for example, a diaphragm of about ⅜" in thickness). Since the diaphragm is relatively thin and is driven by units of the same resonant frequency, it is apparent that all parts of the diaphragm will move with the same phase. Moreover, by the novel mounting and assembly the load mass is reduced, resulting in an increase in the effectiveness of the internal damping of the system as well as that of the external water load, an increase in resonant frequency, and a reduction in Q. Furthermore, by the use of individual washers instead of a single sheet there is freedom from warping during the process of silver soldering. While the novel mounting is described as associated with a magnesium diaphragm, the invention is not limited in that respect as other thin diaphragms of steel, dural, hard rubber, or other material for which conventional mounting methods are unsuitable can be used.

Having thus described our invention, we claim:

1. In a magnetostrictive transducer, a vibratory diaphragm, a magnetostrictive rod, a washer having an opening to seat the radiating end of said rod, means for bonding said washer to said rod, means for bonding said washer to said diaphragm, a coil form encircling said rod and forming a circumferential seat, connecting means between said form and said washer, and a coil wound about said form and supported by said seat.

2. In a magnetostrictive transducer, a vibratory diaphragm, a magnetostrictive rod, a washer having an opening to seat the radiating end of said rod, means for bonding said washer to said rod, means for bonding said washer to said diaphragm, a coil form having a bore encircling said rod, said bore outwardly tapering from a contact area of minimum vibration of said rod to form a clearance to prevent rubbing contact between the two members in rod vibration areas, connecting means between said form and said washer, and a coil wound about said form.

3. In a magnetostrictive transducer, a vibratory diaphragm, a laminated magnetostrictive rod, a washer having a hub dimensioned to receive an end of said rod as the sole support therefor, soldering means for bonding said rod and hub together, a coil form encircling said rod and having a cup-shaped base enclosing said hub, a coil wound on said form and seating on said base, and means for bonding said washer to said diaphragm.

4. In a magnetostrictive transducer, a vibratory diaphragm, a laminated magnetostrictive rod, a washer having a hub dimensioned to receive an end of said rod in contact relation, soldering means for bonding said rod and hub together, a coil form encircling said rod and having flanges seating on said washer, each of said flanges having a slot therethrough, lugs struck from said washer respectively located to traverse said slots and project therefrom to form anchoring means when bent above said flanges, a coil wound upon said form, and means for bonding said washer to said diaphragm.

5. In a magnetostrictive transducer, a vibratory diaphragm, a laminated magnetostrictive rod, a washer having a hub dimensioned to receive an end of said rod in contact relation, soldering means for bonding said rod and hub together, an internally tapered coil form encircling said rod and having flanges seating on said washer, each of said flanges having a slot therethrough, lugs struck from said washer respectively located to traverse said slots and project therefrom to form anchoring means when bent above said flanges, a coil wound upon said form, and means for bonding said washer to said diaphragm.

6. In a magnetostrictive transducer, a vibratory diaphragm, a magnetostrictive rod, a washer having a hub for seating an end of said rod therein, a tubular coil form having a portion encircling said hub and a portion tapering outwardly from a circumferential contact with said rod to form a clearance about said rod, a coil wound on said tapered portion and seating upon said hub encircling part, means connecting said form and washer, and means bonding said washer to said diaphragm.

7. In a magnetostrictive transducer, a vibratory diaphragm, a magnetostrictive rod, means to attach the radiating end of said rod to said diaphragm as the sole rod support, a coil form encircling said rod, means to center said form about said rod, said means forming a circumferential area of contact with said rod only at an area substantially free from vibration, and a coil wound about said form.

ERNESTINE M. HALL,
*Executrix of the Estate of Hubert N. Hall, Deceased.*
J. GUY WOODWARD.

REFERENCES CITED

The following references are of record in the file of this patent:

UNITED STATES PATENTS

| Number | Name | Date |
|---|---|---|
| 942,897 | Garrett et al. | Dec. 14, 1909 |
| 1,022,519 | Warth | Apr. 9, 1912 |
| 2,116,522 | Kunze | May 10, 1938 |
| 2,380,931 | Batchelder | Aug. 7, 1945 |
| 2,407,243 | Batchelder | Sept. 10, 1946 |
| 2,408,404 | Batchelder | Oct. 1, 1946 |